(12) United States Patent
Albertson et al.

(10) Patent No.: US 8,268,107 B2
(45) Date of Patent: Sep. 18, 2012

(54) FLY AWAY CAUL PLATE

(75) Inventors: Thomas A. Albertson, West Grove, PA (US); Karl R. Bernetich, Wilmington, DE (US); Robert J. Freeman, Newtown, PA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 11/859,134

(22) Filed: Sep. 21, 2007

(65) Prior Publication Data

US 2009/0081410 A1  Mar. 26, 2009

(51) Int. Cl.
*B29C 70/68* (2006.01)

(52) U.S. Cl. ..... 156/242; 156/245; 156/297; 156/307.1; 264/258

(58) Field of Classification Search ............... 156/307.3; B29C 70/28
See application file for complete search history.

(56) References Cited

U.S. PATENT DOCUMENTS

| | | | | |
|---|---|---|---|---|
| 2,683,105 A | * | 7/1954 | Forbes et al. | 156/312 |
| 4,385,955 A | * | 5/1983 | Doerfling et al. | 156/245 |
| 4,850,607 A | * | 7/1989 | Trimble | 280/281.1 |
| 5,242,523 A | * | 9/1993 | Willden et al. | 156/285 |
| 5,580,502 A | * | 12/1996 | Forster et al. | 264/46.5 |
| 6,478,922 B1 | * | 11/2002 | Rosevear et al. | 156/297 |
| 6,824,851 B1 | * | 11/2004 | Locher et al. | 428/76 |
| 2002/0125613 A1 | | 9/2002 | Cominsky | |

FOREIGN PATENT DOCUMENTS

| | | | |
|---|---|---|---|
| EP | 1231046 | | 8/2002 |
| GB | 2390605 A | * | 1/2004 |
| WO | WO0196094 | | 12/2001 |

OTHER PUBLICATIONS

PCT Intl Search Report and Written Opinion for Application No. PCT/US2008/074434, dated Jan. 16, 2009, 12 pgs.

* cited by examiner

*Primary Examiner* — William Bell
(74) *Attorney, Agent, or Firm* — Caven & Aghevli LLC

(57) ABSTRACT

Techniques and apparatus for providing a fly away caul plate are disclosed. In an embodiment, a method for curing a composite structure includes placing a pre-cured caul plate proximate an uncured composite lay-up, the lay-up may or may not include one or more stiffeners extending substantially perpendicular to the lay-up surface, the caul plate including an aperture for receiving the at least one stiffener. A force may be exerted against the caul plate to engage the composite lay-up. Heat and/or pressure may be applied to the composite lay-up to cure the stiffener panel and co-bond the caul plate to the composite lay-up.

10 Claims, 4 Drawing Sheets

FLY AWAY CAUL PLATE

TECHNICAL FIELD

The present disclosure teaches caul plates for facilitating the curing of composite lay-ups, and more specifically, to methods and apparatus for providing a fly away caul plate.

BACKGROUND

A caul plate is a plate or sheet that is used to transfer pressure and/or heat to a composite lay-up. In addition, the caul plate may protect an uncured part from undesirable defects. The caul plate is typically placed proximate a lay-up prior to a curing process of a composite part. Mandrels, or other load generating devices, are used to load the caul plate and/or secure a stiffening structure. The mandrels cause the caul plate to exert a substantially perpendicular force against the lay-up during the curing process. When used properly and under normal circumstances, caul plates enable the creation of a smooth surface on a finished part.

Traditionally, caul plates are reused in a composite part curing process until the caul plate is no longer capable of creating a defect-free surface on a finished part. A defect in the caul plate often results in a rejected finished part because defects in the caul plate are transferred to the part. During the setup of the curing process, the caul plates are often positioned over a protective sheet (e.g., Teflon® sheet) and then secured to the lay-up using adhesive tape, requiring the use of additional materials. After each curing process, the caul plate must be removed from the lay-up and cleaned, or otherwise prepared for reuse. The caul plate maintenance may be time consuming in some instances.

Therefore, techniques and apparatus to improve caul plates for manufacture of composite lay-ups have utility.

SUMMARY

Techniques for providing a fly away caul plate are disclosed. In one embodiment, a composite aircraft part includes a composite assembly having a stiffener, and a pre-cured composite sheeting co-bonded with the composite assembly. The sheeting may include a stiffener aperture for receiving the stiffener.

In another embodiment, a method includes curing a composite sheet and assembling the cured composite sheet with an uncured composite lay-up. The composite lay-up may be cured, the curing additionally co-bonding the cured composite sheet to the composite lay-up.

In a further embodiment, a method for curing a composite structure includes placing a pre-cured caul plate proximate an uncured composite lay-up, the lay-up including at least one stiffener extending substantially perpendicular to the lay-up surface, the caul plate including an aperture for receiving the at least one stiffener. A force may be exerted against the caul plate to engage the composite lay-up. Heat and/or pressure may be applied to the composite lay-up to cure the stiffener panel and co-bond the caul plate to the composite lay-up.

The features, functions, and advantages can be achieved independently in various embodiments of the present disclosure or may be combined in yet other embodiments.

BRIEF DESCRIPTION OF THE DRAWINGS

Techniques in accordance with the present disclosure are described in detail below with reference to the following drawings.

DETAILED DESCRIPTION

Methods and apparatus for providing a fly away caul plate are described herein. Many specific details of certain embodiments of the disclosure are set forth in the following description and in FIGS. 1 through 7 to provide a thorough understanding of such embodiments. One skilled in the art, however, will understand that the present disclosure may have additional embodiments, or that the present disclosure may be practiced without several of the details described in the following description. In the present discussion, it is understood that the term "fiber-reinforced composite material" or "reinforced composite material" includes various polymer-based and non-polymeric based materials, commonly referred to as "reinforced composites", "carbon-fiber composites", or still other terms known in the art.

Figure 1:
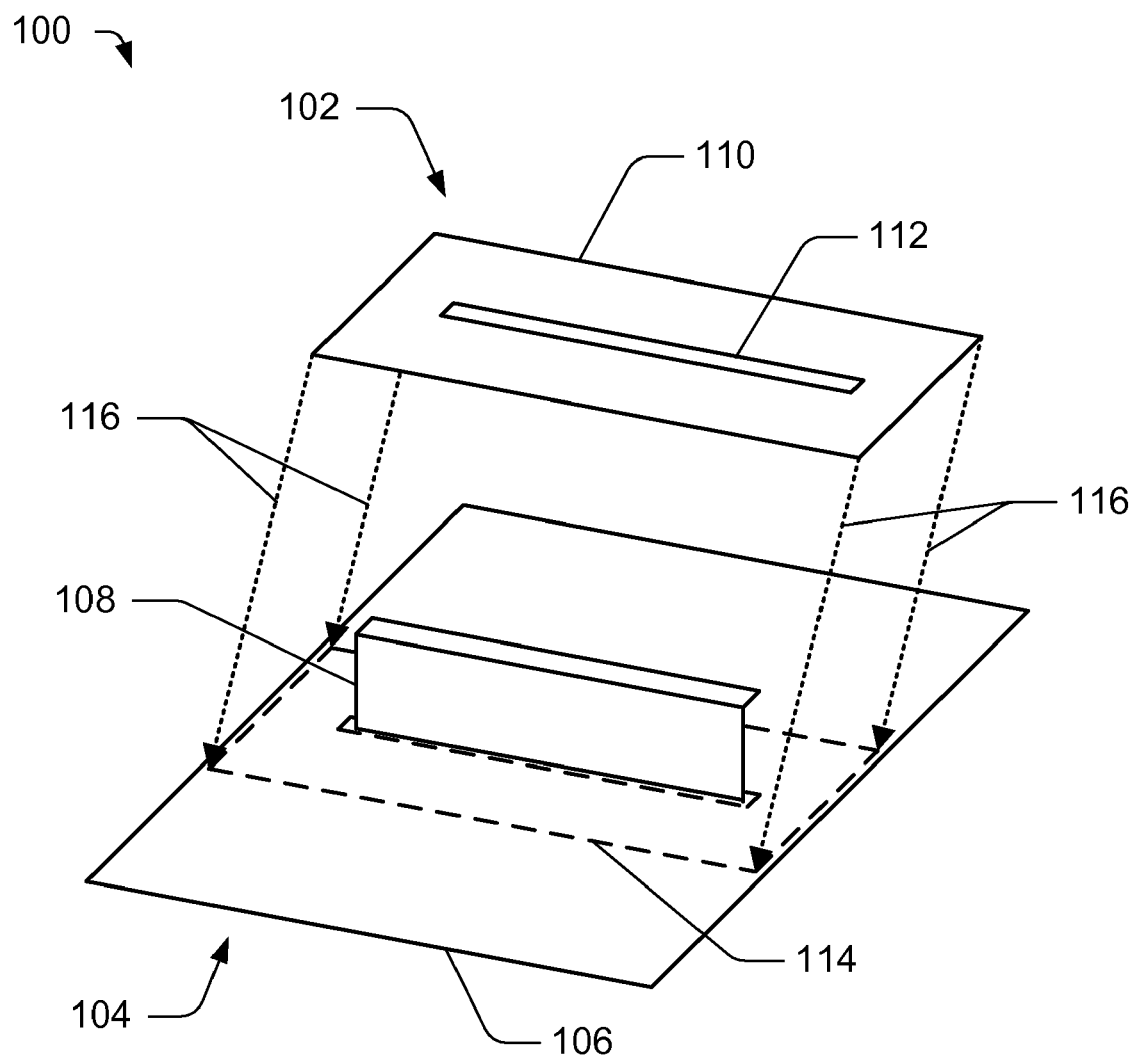
FIG. 1 is an isometric view of a fly away caul plate and composite lay-up having a stiffener in accordance with an embodiment of the disclosure.

FIG. 1 is an isometric view of a fly away caul plate and composite lay-up having a stiffener in accordance with an embodiment of the disclosure. An environment 100 includes a caul plate 102 and a composite lay-up 104. The composite lay-up 104 may include a planar portion 106 formed by curing layers of composite mesh with a resin. In some embodiments, the planar portion 106 may have a curvature across its surface, such as an embodiment where the composite lay-up is for a side panel of an aircraft fuselage. The curing process may include subjecting the composite lay-up 104 to heat and/or pressure to properly cure the composite lay-up. The planar portion 106 may be formed using any number of layers of composite mesh. In some instances, two or more layers of composite mesh may be used to form the planar portion 106 to provide a cured part that meets design requirements (e.g., to achieve a design strength or thickness of a part). Alternatively, the planar portion 106 may be formed substantially from prepreg, a fabric preimpregnated with a resin (polymeric or non-polymeric resin), metal foil, metal sheet, reinforced plastic, or un-reinforced plastic, or a combination thereof.

The composite lay-up 104 may include a stiffener 108. In some instances, the stiffener 108 may be a substantially perpendicular portion projecting from the planar portion 106. For example, the stiffener may be a T-shaped, J-shaped, I-shaped, or C-shaped stiffener. In some embodiments, the stiffener may be project from the planar portion at an angle. The stiffener 108 may provide additional strength to minimize bending, flexing, or other deformations to the planar portion 106 of the composite lay-up 104. For example, the composite lay-up 104 may be a structural member, such as a panel of an aircraft wing, which is subjected to a variety of stresses and forces. The stiffener 108 may be used to maintain the shape of the planar portion 106.

The caul plate 102 includes a plate 110 and may include a stiffener aperture 112. The plate 110 may be substantially planar, or have a curvature across its surface. Typically, the plate 110 has a complementary profile as the planar portion 106. The caul plate 102 is pre-cured before the composite lay-up is cured. This allows the caul plate 102 to evenly transmit weight and heat to the underlying composite lay-up 104 during a curing process when the caul plate is properly positioned proximate the composite lay-up. In addition, the caul plate 102 prevents damage, defects, deformations, and the like on the composite lay-up 104, which may cause a rejection of the final part. In some embodiments, the caul plate 102 may be used to create a smooth finish on the composite lay-up 104. The caul plate 102 may be formed using any number of layers of composite mesh. In some instances, two or more layers of composite mesh may be used to form the caul plate 102. Alternatively, the caul plate 102 may be formed substantially from prepreg, metal foil, metal sheet, reinforced plastic, or un-reinforced plastic, or a combination thereof.

In some embodiments, the caul plate 102 may be flexible. For example, the caul plate 102 may conform to curvature of the composite lay-up 104 by bending or otherwise deformation of the caul plate while the caul plate may still resist defects, scratches, or other undesirable deformations.

The stiffener aperture 112 allows the caul plate 102 to be placed over a stiffener and proximate the planar portion 106 at an alignment location 114. For example, an alignment assembly path 116 may be used to position the caul plate 102 proximate the planar portion 106 of the composite lay-up 104 prior to curing a composite lay-up part.

Figure 2:
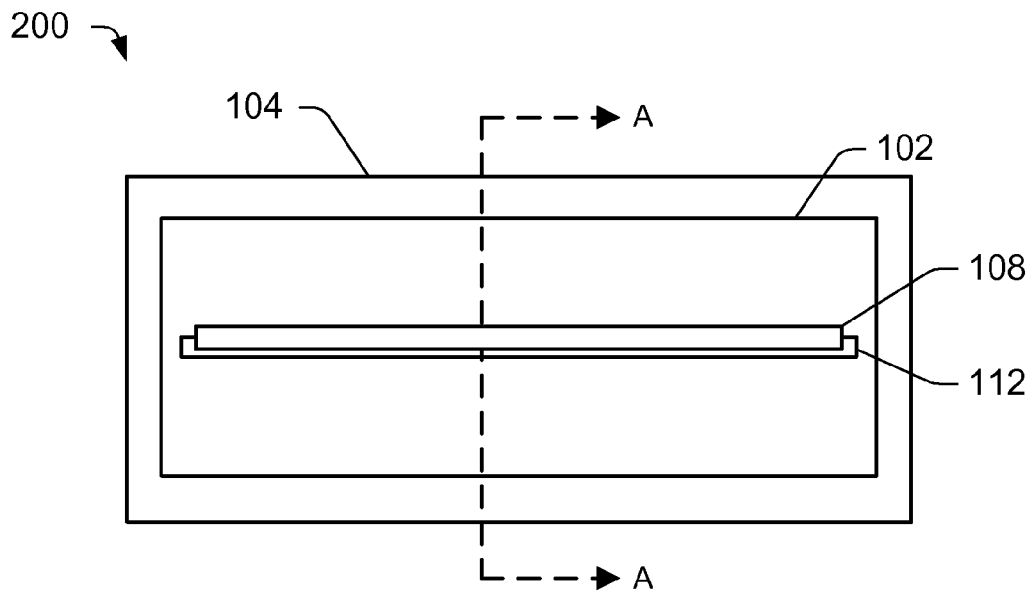
FIG. 2 is a schematic of a fly away caul plate having a single stiffener aperture in accordance with another embodiment of the disclosure.

FIG. 2 is a schematic of a fly away caul plate having a single stiffener aperture in accordance with another embodiment of the disclosure. A composite part 200 may include the caul plate 102 having the plane 110 with a substantially parallelogram profile. In other embodiments, the caul plate 102 may include a profile that is not a parallelogram. The stiffener aperture 112 may be large enough to receive the stiffener 108 when the caul plate 102 is positioned proximate the planar portion 106.

Figure 3:
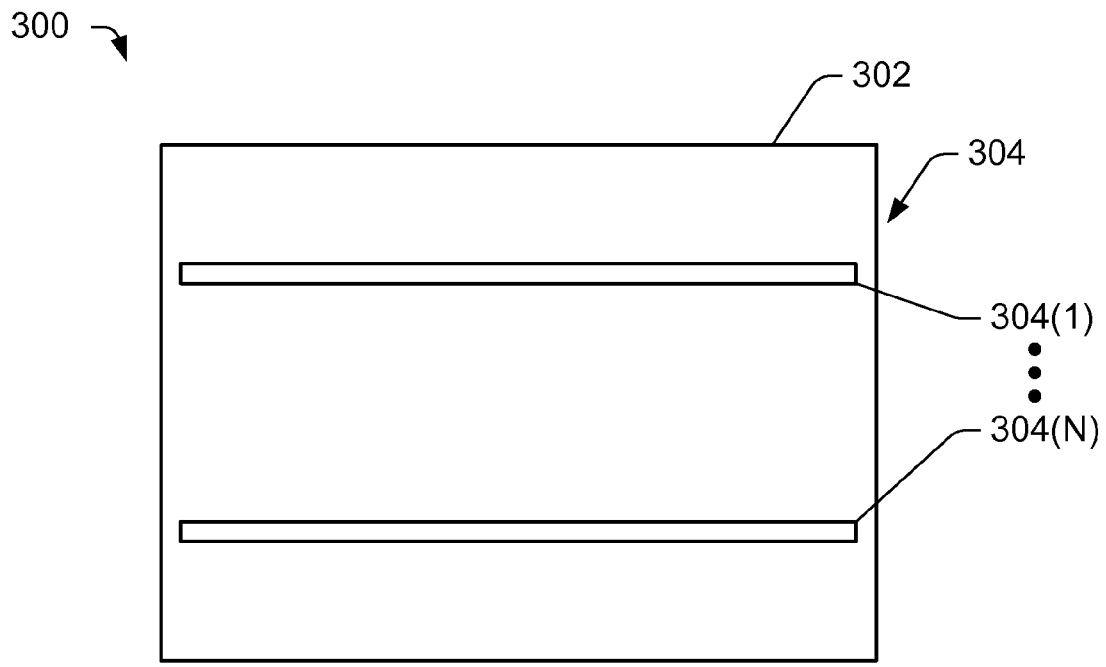
FIG. 3 is a schematic of a fly away caul plate having a multiple stiffener apertures in accordance with yet another embodiment of the disclosure.

FIG. 3 is a schematic of a fly away caul plate having a multiple stiffener apertures in accordance with yet another embodiment of the disclosure. A caul plate 300 may include a caul plate 302 having two or more stiffener apertures 304. For example, the caul plate 300 may include a first stiffener aperture 304(1) and a last stiffener aperture 304(N). Each stiffener aperture 304 is configured to receive a stiffener, such as the stiffener 108, when the caul plate 300 is positioned proximate the composite lay-up 104. Multiple stiffener apertures may be advantageous for decreasing the preparation time for a composite lay-up before a curing process.

Figure 4:
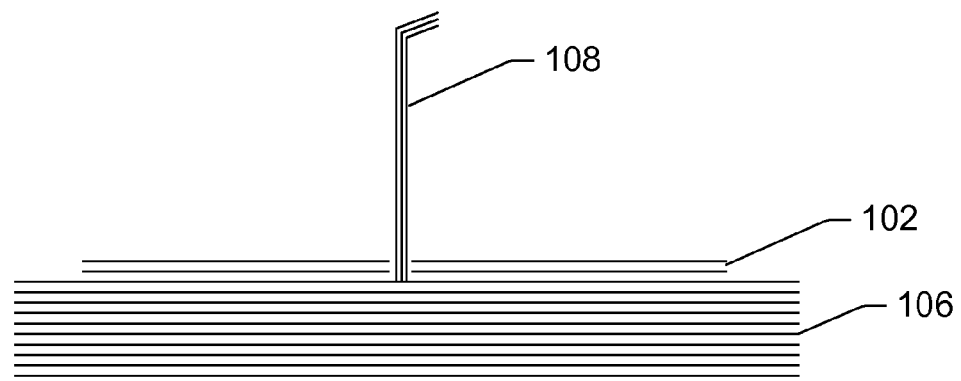
FIG. 4 is a cross-section view of FIG. 2 depicting a fly away caul plate having layers of composite material in accordance with an embodiment of the disclosure.

FIG. 4 is a cross-section view of FIG. 2, along lines A-A, depicting a composite part 400 including a fly away caul plate having layers of composite material in accordance with an embodiment of the disclosure. As depicted, the planar portion 106 may include a number of layers of composite mesh which are cured with a resin. Before a curing process, the uncured planar portion 106 is layered with uncured composite mesh and resin. A number of layers are placed upon one another to form the desired thickness of the final part (minus the thickness of the caul plate 102). For example, if each layer of composite mesh is 0.01 inches thick and the caul plate is 0.02 inches thick (e.g., formed from two layers of composite mesh), a final product thickness of 0.1 inches would require eight layers of composite mesh to form the planar portion 106.

Figure 5:
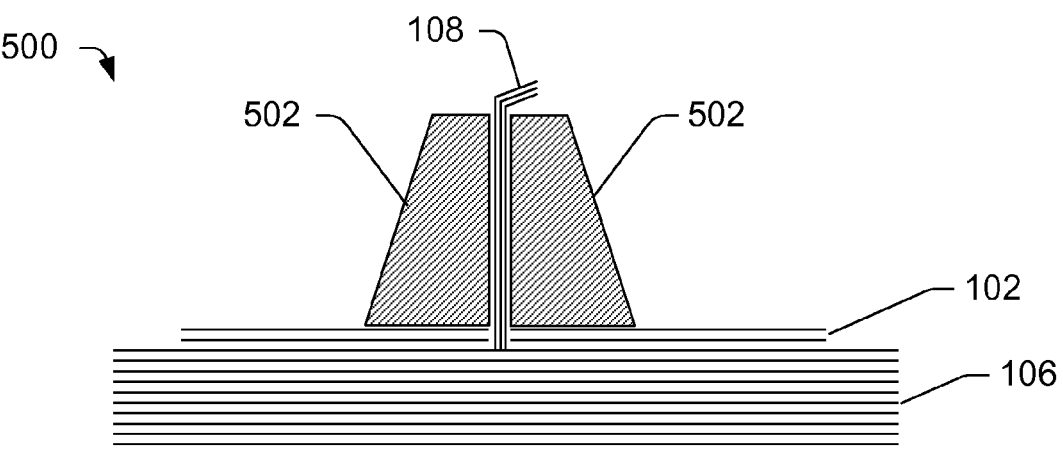
FIG. 5 is a cross-section view of FIG. 2 depicting a fly away caul plate and a force generating device in accordance with another embodiment of the disclosure.

FIG. 5 is a cross-section view of FIG. 2 depicting an assembly 500 including a fly away caul plate and a force generating device in accordance with another embodiment of the disclosure. In some embodiments, one or more mandrels 502 may be used to apply a force against the caul plate 102, which in turn transfers the force to the planar portion 106 when the assembly 500 is situated on a surface. In addition, or alternatively, the mandrel 502 may be used to secure the configuration of the stiffener 108 during the curing process. The mandrel may be formed of rubber, metal, plastic, or any combination thereof. In other embodiments, the mandrel 502 may be replaced by a force generating device, such as a mechanical arm, bladder, or other device which is configured to apply a force to the caul plate 102 and/or secure the stiffener 108.

Figure 6:
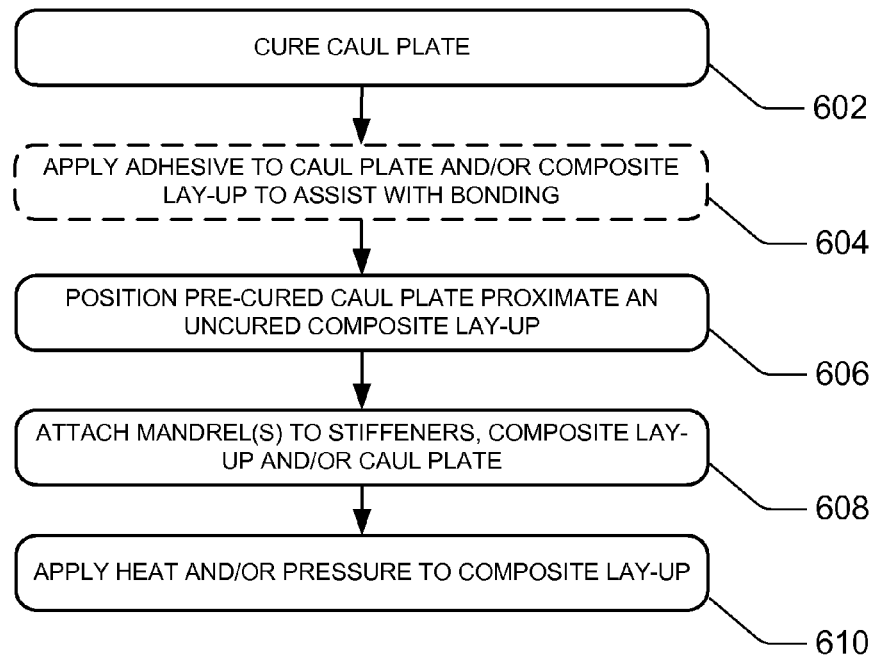
FIG. 6 is a flow diagram illustrating a process for curing a composite lay-up with a fly away caul plate in accordance with an embodiment of the disclosure.

FIG. 6 is a flow diagram illustrating a process 600 for curing a composite lay-up with a fly away caul plate in accordance with an embodiment of the disclosure. At a block 602, the caul plate 102 is cured. At an optional block 604, adhesive is applied to the caul plate 102 and/or the composite lay-up 104. The adhesive may create a bond or strengthen a bond between the caul plate 102 and the composite lay-up 104. Additionally or alternatively, the caul plate 102 may be bonded to the composite lay-up 104 by the resin contained in the composite lay-up and/or the caul plate.

At a block 606, the pre-cured caul plate 102 may be placed proximate an uncured composite lay-up. For example, the caul plate 102 may be placed over the stiffener 108, such that the stiffener 108 is received by the stiffener aperture 112, following the alignment assembly path 116 as shown in FIG. 1. Because the caul plate 102 is co-bonded with the composite lay-up 104, no additional materials are necessary such as a Teflon® sheet. A mandrel 502 may be positioned against the caul plate 102 and/or the stiffener 108 at a block 608. The mandrel 502 may secure the stiffeners and/or exert a force to the composite lay-up 104. Each mandrel 502 may be secured to the composite lay-up with tape, a jig, or other securing mechanism. In such an instance, the pre-cured caul plate 102 may protect the composite lay-up from defects, scratches, and other undesirable deformations. At a block 610, heat and/or pressure may be applied to the composite lay-up 104 to assist in curing the composite lay-up.

Figure 7:
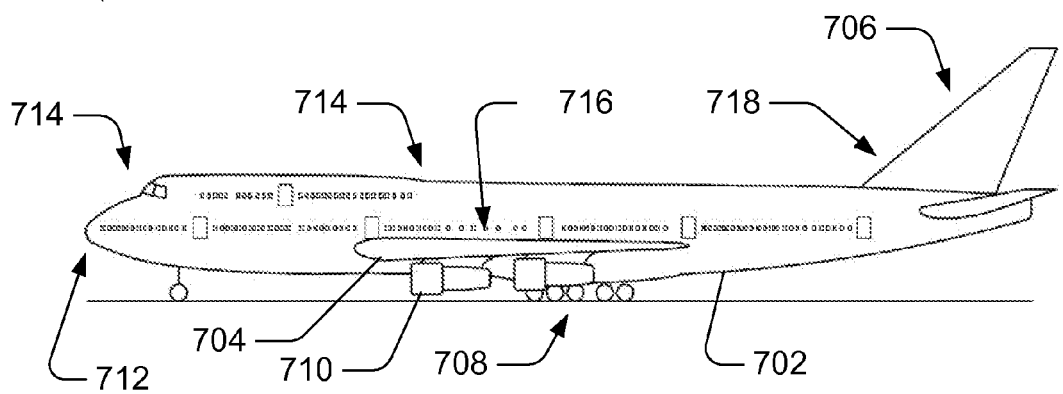
FIG. 7 is a side elevational view of an aircraft having one or more parts cured with fly away caul plates in accordance with another embodiment of the disclosure.

FIG. 7 is a side elevational view of an aircraft 700 having one or more parts cured with fly away caul plates in accordance with another embodiment of the disclosure. One may appreciate that parts cured with caul plates may be employed in a wide variety of locations, including the fuselage, wings, empennage, body, and walls of the aircraft 700. In alternate embodiments, parts cured with fly away caul plates may be used on other types of structures, vehicles, and platforms, such as motor vehicles, aircraft, maritime vessels, or spacecraft, or other suitable applications. For example, the aircraft 700 may include many parts cured with fly away caul plates throughout the skin of the aircraft in accordance with an embodiment of the disclosure.

In this embodiment, the aircraft 700 includes a fuselage 702 including wing assemblies 704, a tail assembly 706, and a landing assembly 708. The aircraft 700 further includes one or more propulsion units 710, a control system 712 (not visible), and a host of other systems and subsystems that enable proper operation of the aircraft 700. One should appreciate that parts cured with fly away caul plates may be employed in any suitable portion of the aircraft 700, such as in a fuselage 702 with a fuselage caul plate 714, wing assemblies 704 with a wing assembly caul plate 716, tail assembly 706 with a tail assembly caul plate 718, and any other suitable areas of the aircraft 700. In general, the various components and subsystems of the aircraft 700 may be of known construction and, for the sake of brevity, will not be described in detail herein.

Although the aircraft 700 shown in FIG. 7 is generally representative of a commercial passenger aircraft, including, for example, the 737, 747, 757, 767, 777, and 787 models commercially available from The Boeing Company of Chicago, Ill., the inventive apparatus and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method, comprising:
   curing a caul plate from reinforced composite material to create a fully-cured, rigid, caul plate, wherein the caul plate comprises at least one aperture extending across a surface thereof;
   positioning the fully-cured, rigid caul plate proximate a composite lay-up that is uncured, wherein the composite lay-up comprises a planar portion and a stiffener structure projecting from a surface of the planar portion and which fits through the aperture in the caul plate; and
   curing the composite lay-up, the curing co-bonding the fully-cured caul plate to the composite lay-up by applying a unilateral force to a point on a first surface of the fully-cured caul plate so that the force is transferred as substantially evenly applied pressure upon an adjoining surface of the composite lay-up that is situated adjacent a second surface of the fully-cured caul plate, whereby the caul plate forms an outside skin of a fully cured component comprising the composite layup and the caul plate.

2. The method of claim 1, wherein the stiffener extends substantially perpendicularly from the planar portion and has a cross-section that is formed in one of a T-shape, J-shape, I-shape, or a C-shape.

3. The method of claim 1, wherein the stiffener is uncured.

4. The method of claim 1, wherein curing the composite layup comprises applying a force against the caul plate at a point on a surface of the caul plate proximate the stiffener.

5. The method of claim 4, wherein applying a force against the caul plate comprises positioning two mandrels on opposing sides of the stiffener.

6. A method of curing a composite structure, comprising:
   placing a fully-cured, rigid caul plate proximate an uncured composite lay-up, the uncured composite lay-up including at least one stiffener extending substantially perpendicular to a surface of the uncured composite lay-up, the fully-cured caul plate including an aperture for receiving the at least one stiffener;
   exerting a force against the fully-cured caul plate that is transferred to the uncured composite lay-up as a substantially evenly applied pressure across the uncured composite lay-up; and
   applying heat to the composite structure to cure the at least one stiffener and co-bond the fully-cured caul plate to the uncured composite lay-up, whereby the caul plate forms an outside skin of a fully cured component comprising the composite layup and the caul plate.

7. The method of claim 6, wherein the stiffener has a cross-section that is formed in one of a T-shape, J-shape, I-shape, or a C-shape.

8. The method of claim 6, wherein the stiffener is uncured.

9. The method of claim 6, further comprising applying a force against the caul plate at a point on a surface of the caul plate proximate the stiffener.

10. The method of claim 6, wherein exerting a force against the fully-cured caul plate comprises positioning two mandrels on opposing sides of the stiffener.

* * * * *